May 7, 1957     N. A. CHRISTOPHER     2,791,302
PEDAL CONTROLS FOR SELF-PROPELLED VEHICLES
Filed May 15, 1956
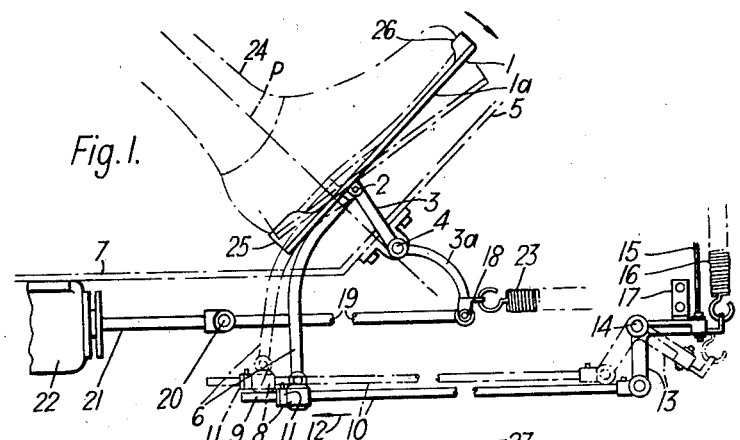
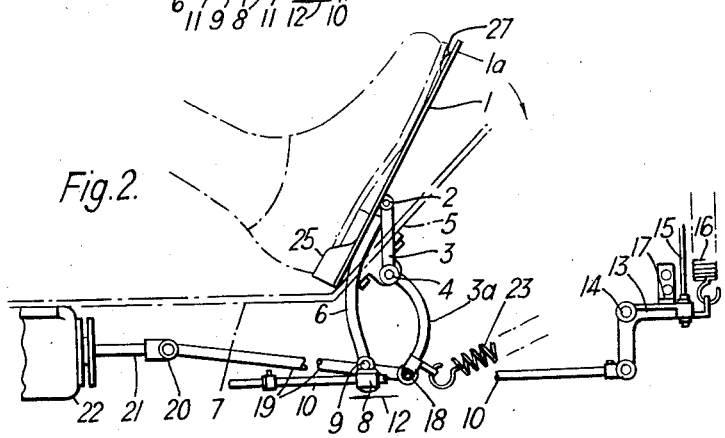
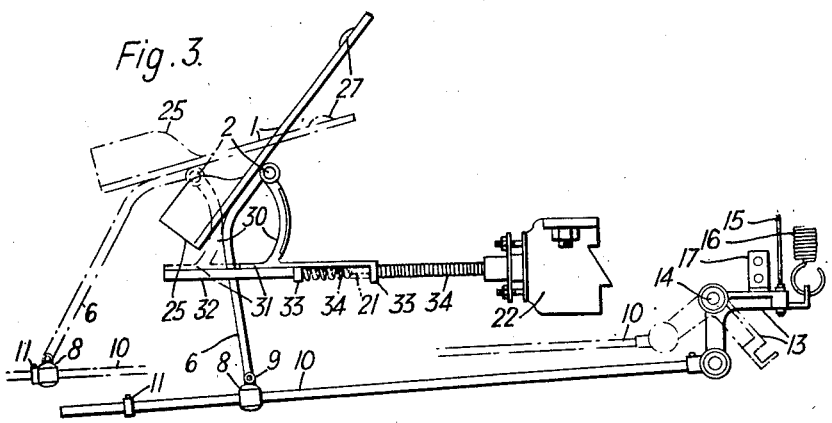
Noel Albert Christopher *Inventor*
By Dowell & Dowell *Attorneys*

2,791,302
PEDAL CONTROLS FOR SELF-PROPELLED VEHICLES

Noel Albert Christopher, Singapore, Singapore

Application May 15, 1956, Serial No. 585,092

Claims priority, application Great Britain May 27, 1955

7 Claims. (Cl. 192—3)

This invention relates to pedal controls for vehicles, and has for an object to provide a single pedal for controlling both the accelerator and the brake whereby neither can be operated simultaneously, but each can be operated at will by the same foot without the necessity for moving the feet from one position to another, as is customary in most pedal-controlled self-propelled vehicles.

Another object is to provide single-pedal actuating means for mechanically controlling the brake and accelerator mechanisms so that, when either is actuated, the other is automatically returned to its inoperative or zero position.

Another object is to provide single-pedal actuating means for the brake and accelerator mechanisms of a self-propelled vehicle which is readily adaptable to existing vehicles having two-pedal control.

According to the present invention, the said pedal is articulated to a fixed part of the vehicle so as to be capable of pivotal motion about a horizontal axis lying transversely of the vehicle and of bodily displacement in a direction generally perpendicular to the said axis, the pivoted motion actuating one control mechanism whilst the bodily displacement motion operates the brake mechanism.

A preferred practical embodiment of the invention will now be particularly described by way of illustration only and with reference to the accompanying drawings in which:

Fig. 1 is a diagram showing, in full lines, the pedal and associated components of the brake and accelerator mechanisms in their zero or unoperated positions and, in chain lines, the same components when the accelerator mechanism is operated;

Fig. 2 is a similar diagram showing the brake mechanism only operated; and

Fig. 3 is a diagram similar to Fig. 1 showing an alternative construction.

Referring first to Figs. 1 and 2 of the drawings, a pedal 1 consisting of a rigid plate, of convenient length to accommodate the driver's foot, is articulated by a transverse horizontal pivot pin 2 to one end of a support bracket 3 in the form of a rigid two-arm lever 3, 3a which is in turn pivotally mounted at 4 on a fixed part 5 of the vehicle structure so as to permit bodily displacement of the pivot in a direction generally perpendicular to its axis. To the underside of the pedal 1 is secured a downwardly and rearwardly curved arm 6 whose lower end projects below the floor 7 of the vehicle body and has a sleeve 8 pivotally attached thereto at 9. Through the sleeve 8 passes a rod 10 which controls the engine throttle or other accelerator mechanism and is freely slidable therein, an abutment collar 11 being adjustably clamped to the rod behind the sleeve 8 to limit the relative sliding movement between these parts in the actuating direction, indicated by the arrow 12.

The forward end of the rod 10, which lies longitudinally of the vehicle, is pinned to one arm of a bell-crank lever 13 pivoted at 14 on a part of the vehicle structure, the end of the other arm having secured thereto one end of the accelerator control linkage 15. A tension return spring 16 is also connected to this arm of the bell-crank to bias the accelerator linkage to the throttle-closing position as defined by a fixed stop 17 for the second bell-crank arm.

The operation of the mechanism so far described is illustrated in chain lines in Fig. 1. By depressing the toe end of the pedal 1, the latter rocks about its pivot 2, without moving the bracket 3, to force the curved lever 6 backwards. This in turn pulls the rod 10 backwards by engagement of the sleeve 8 with the abutment collar 11, and opens the throttle. On release of the toe pressure on the pedal 1, the spring 16 returns the linkage to the closed position shown in full lines in Fig. 1.

The lower extension 3a of the bracket 3 is pinned at 18 to a rearward-extending rod 19 which is coupled at 20 to the piston rod 21 of a brake servo or master cylinder 22. A strong tension return spring 23 is connected to the extension lever 3a for biasing the pedal support bracket 3 to the zero or off position shown in full lines in Fig. 1.

In order to apply the brakes, the pedal 1 is pressed forwards and slightly upwards by the driver's heel, causing it to swing the bracket 3 and extension lever 3a about the pivot 4 and force the rod 19 backwards (see Fig. 2). At the same time, the curved arm 6 is swung forwards, and the sleeve 8 on the lower end thereof slides idly along the throttle rod 10, no force being transmitted thereto by the arm 6 in this direction of motion of the pedal 1. The throttle is, therefore, automatically closed by its return spring 16 when the brakes are being applied.

The pedal 1 and the support bracket 3 are arranged so that, in their inoperative or zero position, the points of articulation 2 and 4 are substantially aligned with the normal line of thrust P of the driver's leg 24 as it rests idly on the pedal 1.

The pedal 1 preferably has a shallow wall 25 around the heel end thereof, and may have either a similar wall 26 (Fig. 1) at the toe end or a transverse rib 27 (Fig. 2) located at approximately the position of the toes of an average size of foot. The front surface 1a of the pedal 1 may be roughened or corrugated, or covered with a layer of rubber if desired.

In the construction shown in Fig. 3, the support bracket 30 for the pedal 1, instead of being pivotally mounted as in Figs. 1 and 2, is rigidly carried on a shoe or slide 31 working on a rectilinear guide 32. The slide 31 has a depending flange 33 at its forward end to which is secured the piston rod 21 of a brake servo or master cylinder 22. The piston rod 21 is surrounded by a strong helical compression spring 34 which biases the bracket 30 to its zero or inoperative position indicated in chain lines. The full line positions of the parts 1, 6, 8, 10 and 30 represent the full braking positions, whilst the chain line positions of the pedal 1, arm 6, and rod 10 represent the full acceleration positions. In this construction the pedal support 30 is linearly displaceable on the slide 31.

What I claim is:

1. Means for actuating the accelerator and brake control mechanisms of a self-propelled vehicle comprising a pedal support displaceable in a vertical plane parallel to the longitudinal axis of the vehicle; a single pedal articulated to said support about a horizontal axis located intermediate the ends of the pedal; a positive connection between the pedal support and one of the control mechanisms; resilient biasing means operative on the pedal support to urge it to a zero position; a rod extending lengthwise of the vehicle and coupled to the other control mechanism; an arm rigid with the pedal and slidably engaged with said rod; and an abutment on said rod for engagement by the arm in the direction of its displacement for operating the corresponding control mechanism.

2. Means for actuating the accelerator and brake control mechanisms of a self-propelled vehicle comprising a support bracket pivoted on the vehicle structure about a transverse horizontal axis and biased to a zero position, an elongated rigid pedal pivoted on the bracket about a parallel axis located intermediate the ends of the pedal, a rigid extension of the bracket beyond the pivotal mounting thereof, a direct connection between the free end of the said extension and one of the control mechanisms, an arm rigid with the pedal, a rod extending in a direction generally perpendicular to the pivotal mounting of the bracket and in sliding engagement with the arm on the pedal, a connection between the rod and the other control mechanism, an abutment on the rod engageable by the arm on the pedal in the direction of movement thereof for operating the said other control mechanism away from its zero position.

3. Actuating means according to claim 2 wherein the bracket extension is directly connected to the vehicle brake control mechanism, and a biasing spring is operative on the said extension to bias it to a zero position corresponding to the brake release position of the control mechanism.

4. Actuating means according to claim 3 wherein the rod is coupled to the accelerator control mechanism, and spring means is operative thereon to bias it to a zero position corresponding to minimum speed of the vehicle motor.

5. Means for actuating the accelerator and brake control mechanisms of a self-propelled vehicle comprising an upright support bracket slidable longitudinally of the vehicle; a single pedal articulated to the upper end of said bracket about a horizontal axis located intermediate the ends of the pedal; a positive connection between the said bracket and one of the control mechanisms; biasing means operative on the said bracket to urge it to a zero position; a rod extending in a direction generally perpendicular to the pivotal mounting of the bracket and in sliding engagement with the arm on the pedal, a connection between the rod and the other control mechanism, an abutment on the rod engageable by the arm on the pedal in the direction of movement thereof for operating the said other control mechanism away from its zero position.

6. Actuating means according to claim 5 wherein the bracket is rigid with a shoe which is slidably mounted on a fixed guide on the vehicle, and the said shoe is directly coupled to one control mechanism.

7. Actuating means according to claim 6 wherein the shoe is connected to the brake control mechanism, and a spring is mounted between the shoe and an abutment rigid with the vehicle for biasing the shoe to a zero position corresponding to the off position of the brake control mechanism.

References Cited in the file of this patent

UNITED STATES PATENTS

| 2,332,122 | Vaughn | Oct. 19, 1943 |
| 2,499,280 | Redmon | Feb. 28, 1950 |
| 2,730,214 | Scott | Jan. 10, 1956 |